United States Patent Office 2,787,608
Patented Apr. 2, 1957

2,787,608

POLYSULFIDE COMPOSITIONS AND CURE

George Gregory, Van Nuys, and Irvin P. Seegman, Glendale, Calif., assignors to Products Research Company, Los Angeles, Calif., a corporation of California No Drawing. Application July 8, 1955,
Serial No. 520,927

15 Claims. (Cl. 260—79.1)

This invention relates to compositions containing polyalkylene polysulfides, materials for use therein and novel methods of insuring the cure of such compositions for the attainment of optimum physical and chemical properties.

It may be said that this invention is based upon the discovery that certain curing agents have a differential or selective curing action on polymers contained in polyalkylene polysulfides, and by the utilization of such curing agents the compositions can be cured at normal room temperatures into cured films or bodies which are homogeneous and characterized by unexpectedly enhanced properties, particularly evident by increased resistance to high temperatures and resistance to the solvent and leaching action of hydrocarbons.

By the term "polyalkylene polysulfide" as used herein, reference is made to those polymers and synthetic rubber-like materials of the type referred to in United States Patents Nos. 1,890,191, 2,049,974, 2,100,351, 2,216,044, 2,466,963 and 2,474,859. These various polysulfide synthetic polymers are produced in the form of liquids, solids and dispersions, and are sometimes referred to as "polyfunctional liquid mercaptans" (when in liquid form).

Base compositions containing polyalkylene polysulfides may be applied to surfaces which are to be protected by a spatula or by a brush, or they may be extruded cast or molded. These compositions when properly compounded are capable of being cured or vulcanized even at room temperatures to produce films or bodies which have desirable characteristics such as resistance to a wide range of solvents, low diffusion rates of gases therethrough, good resistance to oxidation, ozone and weathering, adherence to a metal, a desirable resiliency and a service temperature range of from about —70° F. to about 200° F. As a result such polysulfide polymers have been used as sealants between metal surfaces, in pressurization of aircraft, as a sealant in air and gas ducts, as protective linings in gasoline reservoirs and containers, as adhesives and in many other useful applications.

Despite the usefulness and practical merit of the polyalkylene polysulfides cured with standard well known curing agents such as lead dioxide, the products are not capable of withstanding high temperatures and their usefulness is therefore somewhat limited.

It is an object of the present invention to provide methods of curing and materials for use in curing whereby cured elastomers or thioplasts capable of withstanding prolonged exposures to temperatures as high as 350° F. without heat softening or material change in properties can be obtained.

A further object of the invention is to disclose and provide a method of curing polysulfide polymers of a heterogeneous character into cured elastomers which are substantially homogeneous and have enhanced physical and chemical properties.

Other objects and advantages of the invention will become apparent from the following disclosure of exemplary embodiments and from the data set forth hereafter.

Although as previously indicated the invention can be used to great advantage with any of the polyalkylene polysulfides, whether in liquid or solid form, particular attention will be drawn, for purposes of illustration, to the use of the invention with the liquid polymers.

As is well known, polysulfide synthetic polymers useful as base ingredients in carrying out the invention may be made by reacting polyfunctional organic compounds with alkali metal polysulfides where the functionality is due to the presence of two or more constituents split off by reaction with said polysulfide; chlorine is a typical commercial representative of such functional substituents. The polymers may also be made by the reaction of polymercapto bodies with an agent which supplies oxygen or sulfur in active form and causes polymer formation by the removal of hydrogen and its conversion into water or hydrogen sulfide.

The particular polysulfide polymers with which this invention has to do are a liquid type of "polyalkylene polysulfides" which may be represented by the general type formula

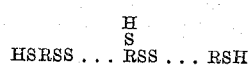

These polymers are composed essentially of the unit RSS and the molecular weight will vary with the number of these units in the polymeric molecule, and also with the specified structure of the organic radical R in the said molecule. The actual structure of the various polyalkylene polysulfides, of which there may be many, may differ widely with differences in the specific structure of the radical R but all these polymers are characterized by polyfunctionality in terms of SH (mercapto) groups. The significant functional groups are SH groups—whatever be the nature of the connecting organic radical R, and whether this be a single radical, such as an ethylene radical or a formal radical such as dichlorodiethyl formal, or a mixture of such radicals.

For convenience in describing these polymeric bodies, the connecting organic radical R appearing in the above illustrative generalized formula may be defined as any polyvalent organic radical containing at least the grouping—$CH_2$—which results from the splitting off of at least two carbon-attached negative substituents from an organic compound initially containing at least two such substituents capable of being split off when the said compound is reacted with an alkali metal polysulfide.

Commercially important polyalkylene polysulfides (some of which are distributed under the registered trademark of "Thiokol") are derived from various polyfunctional organic halides and frequently from mixtures of such halides, reacted with an alkali metal polysulfide and thereafter treated in particular manner as described in the earlier of the patents cited above, and others.

The polysulfide polymers which may be cured to a synthetic rubber or vulcanized with great advantage by the materials and methods of the present invention may vary in form from thin syrupy liquids to thick viscous liquids to solids. Their molecular weight may vary from about 200 to about 30,000 or higher. Normally liquid polymers are preferred for use in the present invention, such liquid polymers having an average molecular weight of from about 500 to about 20,000 or higher, as determined in the familiar manner by means of end group titration. Liquid polymers in this range are viscous liquids at ordinary temperatures, have the consistency of thin syrup or molasses, and a viscosity of between about 300 and 150,000 centipoises.

It may be observed that, in general, when prior curing agents such as lead dioxide were employed, the short chain components of liquid polymers of low average molecular weight (say in the range of 500-1500 average molecular weight) were not effectively cross-linked (this term including terminal linkages) and resulted in cured bodies of inferior properties, particularly with respect to strength, compression set and resistance to aromatic hydrocarbons, etc. When lead dioxide was used with more viscous, higher average molecular weight liquid polymers (having an average molecular weight of say 4000) it was possible to obtain cured bodies of better physical properties.

However, it is to be understood that commercially produced polyfunctional liquid mercaptans (here embraced by the term "liquid polymers") are not pure substances; a product having an average molecular weight of say 4000 may contain a large proportion (on the order of 40% to 60%) of polymers of 3000 to 5000 molecular weight, but will also contain material quantities of smaller and larger polymers including those having a molecular weight of 500 or even less and those having molecular weights of 8000 and more. The commercially available liquid polymers are therefore heterogeneous and a cured body made therefrom was similarly heterogeneous; physical and chemical properties could not be developed to optimum in the cured bodies. It may be stated that a liquid polymer containing about 20% of polymers having a molecular weight of 3000 or less does not cure with normal curing agents such as lead dioxide into a body exhibiting the desired physical properties.

The present invention contemplates the use of commercially available polysulfide type polymers containing a heterogeneous mixture of polymers differing in molecular weight, and their treatment with curing agents which appear to cause a more rapid cure and greater cross-linkage between lower molecular weight polymers than the cure effected on higher molecular weight polymers. By such action a given heterogeneous base mixture of polymers is converted into a virtually homogeneous cured body exhibiting materially greater stability and enhanced physical properties, since all of the polymers have been cured to substantially the same desired stage, and have similar, mutually compatible cooperating properties.

This novel mode of operation and desirable result has been obtained in accordance with the present invention by the use of curing agents which conform to many other necessary requirements. The present invention is carried out by curing agents which not only act in the manner stated hereinabove but which perform the cure at normal atmospheric temperatures, without appreciable exothermic reaction, can cure in a void without need of outside air, at a rate sufficiently slow to permit a batch of composition to have a reasonably long application life (that is, period of time after mixing during which the batch can be extruded, cast, molded or otherwise applied in use) without causing appreciable curing shrinkage or undue expansion, and without impairing other physical properties. Moreover, the curing agents here contemplated are compatible with the presence of fillers, retarders, adhesion additives and other components of a batch.

The preferred curing agents found to have the unexpected properties hereinabove noted (as well as other advantages) comprise the group of soluble salts of chromic acid such as chromates and bichromates including the sodium, potassium and ammonium chromate and bichromate salts. Any soluble salt of chromic acid which, upon solution, liberates anions containing chromium may be used in carrying out the method of this invention provided it has a solubility in the solvent equal to or greater than that of the potassium bichromate specified hereinabove. Since the solubility of potassium bichromate at 20° C. is indicated in standard reference texts to be about 12 grams per 100 ml. of water (Solubilities of Inorganic and Organic Compounds, Volume I, page 528, Seidell, 1919 ed.), any salt of chromic acid having an equivalent or greater solubility and the ability to liberate chromium anions may be successfully employed.

These preferred curing agents may be incorporated in the polyalkylene polysulfide in the form of finely divided solids or in the form of a solution. In the event the base mixture is to contain fillers or additives, such fillers or additives may be blended into the liquid polymer on a suitable mill such as a roller mill or paint mill and the curing agent thereafter incorporated into the mixture in any suitable manner. The curing agents are preferably added to the polyalkylene polysulfides in stoichiometric proportions although this is not critical. In general, the curing agents are added at the rate of between about 3 and 10 parts by weight per 100 parts of the polyalkylene polysulfide, it being understood that less than 3 parts may undesirably retard the rate of cure or prevent complete vulcanization whereas an excess (for example, 20 or 25 parts per 100 parts of the polymer) may tend to impair desirable properties and increase the cost. A cured composition resulting from the use of polymers with a curing agent alone may contain as high as 97% by weight of such polymers.

The remarkable results obtained by the use of the method of this invention, which results can only be attributed to the more rapid, differential and selective action of the curing agent upon the lower molecular weight polymer components of a mixture of liquid polymers, are exemplified in Table I. Batch A was used as a check and employed lead dioxide as the curing agent. Batch B employed sodium bichromate. The same liquid polymer was used in each batch, this liquid polymer having an average molecular weight of about 4000 and a viscosity on the order of 35,000-45,000 centipoises. This liquid polymer or polyalkylene polysulfide (may also be termed a polyfunctional liquid mercaptan; can be derived from dichlorodiethyl formal and trichloroethane or trichloropropane reacted with a metallic disulfide) contained about 20% of polymers having a molecular weight of about 2000 and lower and a similar quantity of polymers exceeding 6000 in molecular weight. Mixing and blending of each batch was similar; the batches were tested under identical approved conditions.

*Table I*

|  | (A) | (B) |
|---|---|---|
| Formulation, Parts by Weight: | | |
| Base— | | |
|   Polyalkylene polysulfide | 100 | 100 |
|   Sodium bichromate | | 7 |
| Activating Mix: | | |
|   Water | | 3 |
|   $PbO_2$ | 7 | |
|   Stearic acid | 2 | |
| Properties: | | |
|   Application life, hours | 12 | 12 |
|   Tack free time, hours | 36 | 24 |
|   Cure time, hours | 96 | 72 |
|   Thermal softening as indicated by shore hardness— | | |
|     Initial, at 75° F | 35 | 45 |
|     At 325° F. for 5 minutes | 5 | 30 |
|   Prolonged heat resistance, hours— | | |
|     At 300° F | 50 | 180 |
|     At 375° F | Less than 1 Hr. | 10 |
|   Compression Set, percent | 18 | 3 |
|   Resistance to hydrocarbons, percent loss | 48 | 8 |

Attention is called to the fact that each batch had the same application life; batch B made in accordance with this invention became tack free in a shorter period of time. The product of this invention cured more rapidly at atmospheric temperature to a body which had remarkable heat resistance; it will be noted that its Shore hardness was reduced only 33% after being exposed to 325° F. for 5 minutes whereas the lead dioxide check body had lost 87% of its initial hardness. Moreover, as indicated by the results under "Prolonged heat resistance," the method of this invention resulted in a body which could be exposed to 300° F. for 180 hours before it cracked upon being bent 90°, and to a temperature of 375° F. for over 10 times as long as the lead dioxide body. The compression set or percentage loss in thickness when subjected to 120° F. and 10 p. s. i. for 24 hours (general method of ASTM 395-52T, method A) was only ⅙ of that suffered by the lead dioxide body. The loss in weight due to exposure of the body of hydrocarbons (12 days' exposure at 130° F. to a liquid containing 70% by volume of iso-octane and 30% toluene, at a ratio of 1.5 liters of such liquid per cc. of sample) is negligible in the case of a body employing this invention, being only ⅙ of that suffered by the lead dioxide check.

The compound B described above was free from fillers, pigments, modifiers, adhesion additives, etc. to preclude masking of fundamental effects obtained by the method of this invention. Substantially the same results are obtained by the use of other soluble chromates and bichromates, particularly in the form of sodium, potassium and ammonium salts. When these preferred curing agents are in a dry, powdered or ground state, they may

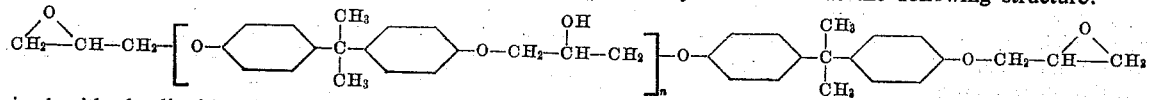

be mixed with the liquid polymer on a paint mill and the resulting base can be shipped and stored for a long time, becoming ready for use whenever water or a solvent is added and mixed therewith. The curing agent can therefore be an integral part of the base during storage and shipment, whereas this is impossible when lead dioxide is employed. Instead of water, organic solvents such as alcohols and ketone may be used with no appreciable change in the desirable properties indicated for Example B in Table I. It may be noted, however, that somewhat larger quantities of solvents may be necessary, for example 5 parts of ethyl alcohol or 5 parts of acetone instead of the 3 parts of water referred to in the example.

Compositions exhibiting similar increased resistance to heat, remarkably increased resistance to hydrocarbon solvents, gasoline, etc., extremely low compression set, and retention of their resiliency and toughness under adverse conditions are obtained by the use of this invention with other heterogeneous mixtures of polysulfide polymers in liquid and solid form, although the results are more striking when liquid polymers are employed.

Compositions of the type exemplified by B (free from filters, additives, etc.) have many uses even though their tensile strength is relatively low. Their resiliency and high dielectric properties coupled with stability over a wide range of temperatures (−70° F. to over 375° F.) and ability to be cast, molded or extruded, adapts them for use as shock-proof matrix or protective encasement for electronic assemblies and devices in rockets, aircraft, tanks, etc. The physical and chemical properties of the cured material resulting from the materials and methods of this invention can be varied to produce a product best suited to the methods of application and the specific use to which it is to be subjected. The degree of copolymerization employed in the manufacture of the polysulfide type of synthetic rubber base and the average molecular weight thereof influences the physical properties. Generally stated, a liquid polymer having a lower average molecular weight (say below 3000) will produce harder bodies than a liquid polymer having a higher average molecular weight, the latter having a lower Shore hardness but better tear resistance.

The addition of and increase in amount of fillers, pigments and reinforcing agents (such as calcium carbonate, iron oxide, aluminum powder, silicon dioxide, clays, zinc sulfide, carbon black, rayon floc, etc.) will in general increase the Shore hardness, toughness and tensile strength and decrease elongation of the product.

The adhesiveness of the cured material to metals, glass, resin-coated objects, etc. may be greatly increased without destruction of other properties by the addition of various resinous or plastic compositions generally in the ratio of 1 to 15 or 20 parts per 100 parts of the polyalkylene polysulfide although as high as 30 or even 50 parts can be used. When used in the lower range of proportions the cured compounds are resilient and slightly softer; when used at a ratio of 30 parts or more, the cured compounds may be harder and more brittle. Primarily due to their outstanding properties of resistance to heat, water and to chemicals, the phenolic and epoxy resins are the preferred resins for this purpose for use with the compositions of the invention. In this regard, the term "phenolic resins" is intended to include the resinous products obtained from the condensation of almost any phenolic body with an aldehyde such as formaldehyde or furfural. Likewise by "exopy resins" is meant any di-epoxy reaction product of a polyhydroxy compound and epichlorohydrin. An example of such product is the result of reaction of bisphenol A and epichlorohydrin which has the following structure:

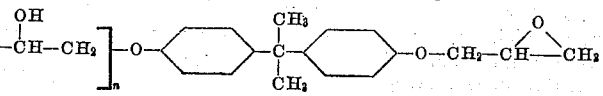

The cured composition resulting from the conjoint use of fillers, pigments, modifiers and resinous components with the polyalkylene polysulfide polymers and curing agent may contain as low as 40% by weight of such polymers.

Table II exemplifies the exceptional results obtained by the curing agents and methods of this invention in the preparation of compositions including fillers and adhesive additives. The two compositions reported in the table were prepared and tested under identical conditions, using the same polyalkylene polysulfide liquid polymer. The formulations were as follows, in parts by weight:

|  | A-1 | B-1 |
| --- | --- | --- |
| Base Mix: |  |  |
| Polyalkylene polysulfide | 100 | 100 |
| Inert fillers | 35 | 35 |
| Retarder (stearic acid) | 1 | 1 |
| Adhesive resin | 5 | 5 |
| Curing Mix: |  |  |
| Lead dioxide (PbO₂) | 10 |  |
| Potassium bichromate |  | 7.5 |
| Water |  | 7.5 |
| Toluene | 7.0 |  |
| Stearic acid | 1.5 |  |

The lead dioxide was intimately mixed with stearic acid and toluene and then this curing mix incorporated into the base mix. In batch B-1 the potassium bichromate was dissolved in the water and the solution intermixed with the base.

Table II

| Test and Method | Formula | |
| --- | --- | --- |
|  | A-1 | B-1 |
| Application life in hours (MIL-S-7502) | 4 | 4 |
| Tack free time in hours (MIL-S-7502) | 24 | 16 |
| Cure time in hours (MIL-S-7502) | 96 | 72 |
| Thermal softening as indicated by Shore hardness (MIL-R-3065): |  |  |
| Initial at 75° C | | |
| At 325° F. for 5 min | 45 | 55 |
| At 300° F. for 72 hours | 15 | 40 |
| At 75° F. after 72 hours at 300° F | 90 | 50 |
| | 95 | 65 |
| Compression set, percent (ASTM 395-52T Method A conducted for 24 hours at 10 p. s. i. and 120° F.) | 20 | 4 |
| Adhesion: pounds per inch (MIL-S-7502A Peel Test conducted at 180° F.) | 40 | 40 |
| Tensile strength, p. s. i. (ASTM D412-51T) | 250 | 450 |
| Ultimate elongation, percent (ASTM D412-51T) | 300 | 250 |
| Resistance to hydrocarbons, percent loss (test method as described above) | 43.0 | 4.3 |
| Prolonged heat resistance, hours (test method described above): |  |  |
| At 270° F | 100 | 240 |
| At 300° F | 40 | 140 |
| At 325° F | 20 | 48 |
| At 350° F | 3 | 15 |
| At 375° F | Less than 1 | 8 |

It will be noted that the product (B-1) made by the method here disclosed retained its Shore hardness at 325° F. whereas the lead dioxide batch (A-1) became very soft at such temperature, and another specimen, after being subjected to 300° F. for 72 hours and then cooled to 75° F. showed that it was practically lifeless and non-resilient. The new product lost only 4% in thickness (compression set) after exposure to 120° F. and 10 p. s. i. for 24 hours, whereas the loss on the check batch was five times as great. The new product resisted cracking when bent 90° even after 8 hours at 375° F. The tensile strength of the new product was almost twice as high as the lead dioxide product, and the resistance to hydrocarbons was ten times better.

The percentage distribution curve of polymers of different molecular weights in a given polyalkylene polymer base will vary, but it can be stated that the present method of curing is eminently suited to any mixture of polymers wherein at least 20% thereof is composed of polymers which are 0.5 or smaller and more than 1.5 the average molecular weight of such mixture.

Although compositions of this invention can be cured at a somewhat accelerated rate by the application of heat to the curing mass, the method of the invention can be effectively and satisfactorily carried out at normal atmospheric, ambient temperatures of, say, 40°–100° F.

As previously pointed out, the curing agents of this invention may be incorporated in the base (containing the polyalkylene polysulfide polymers), shipped and stored, and rendered active and ready for use by incorporating a solvent (aqueous or organic) therein. Alternatively, the solvent can be an integral part of the base during shipment and storage and the curing agent can be incorporated in the base immediately prior to use of the composition; or the base can be solvent-free and free from curing agent, both curing agent and solvent being added to such base prior to its use in the formation of protective coatings, potting of electrical conductors and plugs, extrusion of fillets, caulking, casting, formation of liners, etc. It will be noted that in the first form here stated, the curing agent is maintained in an inactive state until the chromium ions are formed by the addition of solvent.

Some products made pursuant to the present invention are particularly effective when used as protective coatings, exhibiting great resistance to salt spray and salt water and a remarkable corrosion-inhibiting effect on metals, such as magnesium, aluminum, etc. or wherever dissimilar metals are in contact. Moreover, attention is drawn to the fact that the compositions are relatively free from material quantities of volatile solvents and their deleterious effect upon the cured films or bodies.

It may also be noted that the liquid polyalkylene polysulfide polymers as commercially produced contain about 0.2% of water but the presence of this small quantity of water will not prevent the formation of a stable and inactive base compound (containing a preferred curing agent) which can be shipped and stored and then rendered active by the introduction or dissemination of an additional quantity of water or solvent.

To those skilled in the art to which this invention relates, many variations and widely differing embodiments and applications of the invention will suggest themselves without departing from the spirit of and scope of the invention. The disclosures and the description herein are purely illustrative and are not intended to be in any sense limiting.

We claim:

1. A synthetic rubber composition containing between about 40% and 97% by weight of a mixture of liquid polyalkylene polysulfide polymers curable to a synthetic rubber and varying in molecular weight, at least 20% of said mixture being composed of polymers which are less than 0.5 and more than 1.5 the average molecular weight of such mixture, and also containing from 3 to 10 parts by weight of a soluble curing component from the group consisting of sodium, potassium and ammonium chromate and sodium, potassium and ammonium bichromate per 100 parts of such mixture of polymers.

2. A synthetic rubber composition as stated in claim 1 wherein the mixture of polyalkylene polysulfide polymers normally has a viscosity of between about 300 and 150,000 centipoises.

3. In a method of treating compositions containing mixtures of liquid polyalkylene polysulfide polymers curable to a synthetic rubber and varying in molecular weight, at least 20% of said mixture being composed of polymers which are less than 0.5 and more than 1.5 the average molecular weight of such mixture, to impart enhanced heat resistance to cured bodies made from such compositions: incorporating into said compositions a solution of soluble salt of chromic acid in a solvent selected from the group consisting of water and organic solvents to thereby cross-link polymers of higher molecular weight during curing and simultaneously cross-link lower molecular weight polymers at a higher rate and to a greater extent than said higher molecular weight polymers, to obtain a cured elastomer of virtually homogeneous character having an enhanced ability to withstand exposure to high temperatures and materially increased resistance to the action of liquid hydrocarbons, said soluble salt of chromic acid having a solubility in water at 20° C. at least as great as the solubility of potassium bichromate in water at 20° C. and being adapted, upon solution, to liberate anions containing chromium.

4. A method as stated in claim 3 wherein the cross-linking is obtained by a salt of chromic acid selected from the group consisting of sodium, potassium and ammonium chromate and sodium, potassium and ammonium bichromate.

5. A method as stated in claim 3 wherein the mixture of polyalkylene polysulfide polymers has a viscosity of from about 300 to 150,000 centipoises.

6. A method as stated in claim 3 wherein the mixture of polyalkylene polysulfide polymers has an average molecular weight of between about 2000 and 6000.

7. A method of producing cured elastomers having enhanced ability to withstand exposure to high temperatures and materially increased resistance to the use of liquid hydrocarbons which comprises: incorporating into a mixture of liquid polyalkylene polysulfide polymers curable to a synthetic rubber, fillers and modifiers, in the presence of a solvent selected from the group consisting of water and organic solvents, a soluble salt of chromic acid in the proportion of between 3 and 10 parts of said salt per 100 parts by weight of said liquid polymers, said soluble salt of chromic acid having a solublity in water at 20° C. at least as great as the solubility of potassium bichromate in water at 20° C. and being adapted, upon solution, to liberate anions containing chromium, said solvent being a solvent for said soluble salt.

8. A composition containing between about 40% and 97% by weight of a mixture of liquid polyalkylene polysulfide polymers curable to a synthetic rubber and a curing component comprising a soluble salt of chromic acid having a solubility in water at 20° C. at least as great as that of potassium bichromate in water at 20° C. and being adapted, upon solution, to liberate anions containing chromium.

9. A composition as stated in claim 7 wherein the mixture of polyalkylene polysulfide polymers has a viscosity of between 50 and 150,000 centipoises.

10. A composition containing between about 40% and 97% by weight of a mixture of liquid polyalkylene polysulfide polymers curable to a synthetic rubber, and a curing component comprising a soluble salt of chromic acid from the group consisting of sodium, potassium and ammonium chromate and sodium, potassium and ammonium bichromate, said composition containing between about 3 and 10 parts by weight of said salts per 100 parts by weight of said mixture of polymers.

11. An elastomer resulting from curing a composition at normal temperatures, said compositions containing a mixture of liquid polyalkylene polysulfide polymers curable to a synthetic rubber, with a curing component in solution in a solvent selected from the group consisting of water and organic solvents, said curing component comprising a soluble salt of chromic acid having a solubility at 20° C. in water at least as great as that of potassium bichromate in water at 20° C. and being adapted, upon solution, to liberate anions containing chromium, said elastomer being characterized by materially increased resistance to liquid hydrocarbons, its ability to withstand temperatures of 350° F. and higher for a prolonged time without cracking when bent 90° over a 0.5 inch diameter rod and a compression set of less than half, in comparison with a cured elastomer obtained by curing the composition with lead dioxide.

12. In the art of producing a thioplast composition, the steps of intimately mixing a liquid polyalkylene polysulfied polymer curable to a synthetic rubber, with fillers and adhesion additives and then effecting a cure of the polymer by means of a curing component in solution in a solvent selected from the group consisting of water and organic solvents, said curing component comprising a soluble salt of chromic acid having a solubility at 20° C. in water at least as great as that of potassium bichromate in water at 20° C. and being adapted, upon solution, to liberate anions containing chromium.

13. The art of producing a thioplast composition as stated in claim 12 wherein said curing component is selected from the group consisting of sodium, potassium and ammonium chromate and sodium, potassium and ammonium bichromate.

14. In the art of curing liquid polyalkylene polysulfide polymers curable to a synthetic rubber, the steps of maintaining such liquid polyalkylene polysulfide polymers containing a solvent selected from the group consisting of water and organic solvents separate from a curing component comprising a soluble inorganic salt of chromic acid soluble in the selected solvent and having a solubility at 20° C. in water at least as great as that of potassium bichromate in water at 20° C., and mixing said polymers and said curing component just prior to application and cure to liberate in said mixture anions containing chromium.

15. The art as stated in claim 14 wherein the curing component is selected from the group consisting of sodium, potassium and ammonium chromate and sodium, potassium and ammonium bichromate.

References Cited in the file of this patent
UNITED STATES PATENTS

| | | |
|---|---|---|
| 1,195,380 | Patrick | Mar. 26, 1940 |
| 2,402,977 | Patrick et al. | July 2, 1946 |
| 2,584,264 | Foulks | Feb. 5, 1952 |

OTHER REFERENCES

The Merck Index, 6th ed., 1952, Merck & Co., page 1019.